United States Patent
Aibester et al.

(10) Patent No.: US 12,474,833 B2
(45) Date of Patent: Nov. 18, 2025

(54) QUEUE BANDWIDTH ESTIMATION FOR MANAGEMENT OF SHARED BUFFERS AND ALLOWING VISIBILITY OF SHARED BUFFER STATUS

(71) Applicant: MELLANOX TECHNOLOGIES, LTD., Yokneam (IL)

(72) Inventors: Niv Aibester, Herzliya (IL); Barak Gafni, Sunnyvale, CA (US); Aviv Kfir, Nili (IL); Gil Levy, Hod Hasharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 522 days.

(21) Appl. No.: 17/516,731

(22) Filed: Nov. 2, 2021

(65) Prior Publication Data

US 2023/0138522 A1 May 4, 2023

(51) Int. Cl.
*G06F 3/06* (2006.01)

(52) U.S. Cl.
CPC .......... *G06F 3/0604* (2013.01); *G06F 3/0656* (2013.01); *G06F 3/0673* (2013.01)

(58) Field of Classification Search
CPC ..... G06F 3/0604; G06F 3/0656; G06F 3/0673
See application file for complete search history.

(56) References Cited

U.S. PATENT DOCUMENTS

| | | | |
|---|---|---|---|
| 5,014,265 A | 5/1991 | Hahne et al. | |
| 5,235,642 A | 8/1993 | Wobber et al. | |
| 5,367,520 A | 11/1994 | Cordell | |
| 5,541,912 A | 7/1996 | Choudhury et al. | |
| 5,574,885 A | 11/1996 | Denzel et al. | |
| 5,790,522 A | 8/1998 | Fichou et al. | |
| 5,917,947 A | 6/1999 | Ishida et al. | |
| 6,108,713 A | 8/2000 | Sambamurthy et al. | |
| 6,154,446 A | 11/2000 | Kadambi et al. | |
| 6,160,814 A * | 12/2000 | Ren | H04L 49/108 370/429 |
| 6,169,748 B1 | 1/2001 | Barbas et al. | |
| 6,178,448 B1 | 1/2001 | Gray et al. | |
| 6,219,728 B1 | 4/2001 | Yin | |

(Continued)

FOREIGN PATENT DOCUMENTS

| | | |
|---|---|---|
| CN | 1379569 A | 11/2002 |
| EP | 0706298 A2 | 4/1996 |

(Continued)

OTHER PUBLICATIONS

Gran et al., "Congestion Management in Lossless Interconnection Networks", Submitted to the Faculty of Mathematics and Natural Sciences at the University of Oslo in partial fulfillment of the requirements for the degree Philosophiae Doctor, pp. 1-156, Sep. 2013.

(Continued)

*Primary Examiner* — Kenneth M Lo
*Assistant Examiner* — Alexander Vinnitsky (57) ABSTRACT

A network device includes a memory and a memory management circuit. The memory is to store a shared buffer. The memory management circuit is to estimate respective bandwidth measures for one or more queues used in processing packets in the network device, and to allocate and deallocate segments of the shared buffer to at least one of the queues based on the bandwidth measures.

25 Claims, 4 Drawing Sheets

(56) References Cited

U.S. PATENT DOCUMENTS

| | | |
|---|---|---|
| 6,324,165 B1 | 11/2001 | Fan et al. |
| 6,347,337 B1 | 2/2002 | Shah et al. |
| 6,456,590 B1 | 9/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,594,263 B1 | 7/2003 | Martinsson et al. |
| 6,606,666 B1 | 8/2003 | Bell et al. |
| 6,633,395 B1 | 10/2003 | Tuchitoi et al. |
| 6,657,955 B1 | 12/2003 | Bonneau et al. |
| 6,678,277 B1 | 1/2004 | Wils et al. |
| 6,687,254 B1 | 2/2004 | Ho et al. |
| 6,771,654 B1 | 8/2004 | Sang et al. |
| 6,859,435 B1 | 2/2005 | Lee et al. |
| 6,895,015 B1 | 5/2005 | Chiang et al. |
| 6,922,408 B2 | 7/2005 | Bloch et al. |
| 6,973,555 B2 | 12/2005 | Fujiwara et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,215,641 B1 | 5/2007 | Bechtolsheim et al. |
| 7,321,553 B2 | 1/2008 | Prasad et al. |
| 7,324,442 B1 | 1/2008 | Pan et al. |
| 7,327,749 B1 | 2/2008 | Mott |
| 7,330,426 B2 | 2/2008 | Berzosa et al. |
| 7,334,065 B1 | 2/2008 | Rose et al. |
| 7,346,059 B1 | 3/2008 | Gamer et al. |
| 7,391,787 B1 | 6/2008 | McCrosky |
| 7,529,245 B1 | 5/2009 | Muller et al. |
| 7,590,058 B1 | 9/2009 | Cherchali et al. |
| 7,609,636 B1 | 10/2009 | Mott |
| 7,630,306 B2 | 12/2009 | Chuang |
| 7,680,139 B1 | 3/2010 | Jones et al. |
| 7,738,454 B1 | 6/2010 | Panwar et al. |
| 7,747,086 B1 | 6/2010 | Hobbs et al. |
| 7,773,621 B2 | 8/2010 | Jensen |
| 7,773,622 B2 | 8/2010 | Schmidt et al. |
| 7,778,168 B1 | 8/2010 | Rodgers et al. |
| 7,813,348 B1 | 10/2010 | Gupta et al. |
| 7,821,939 B2 | 10/2010 | Decusatis et al. |
| 7,835,380 B1* | 11/2010 | Aloni ............... H04L 12/40032 709/239 |
| 7,853,738 B2 | 12/2010 | Pothireddy et al. |
| 7,856,026 B1 | 12/2010 | Finan et al. |
| 7,872,973 B2 | 1/2011 | Sterne et al. |
| 7,894,343 B2 | 2/2011 | Chao et al. |
| 7,924,708 B2 | 4/2011 | Spink |
| 7,936,770 B1 | 5/2011 | Frattura et al. |
| 7,974,208 B2* | 7/2011 | Brewer ............. H04Q 11/0478 370/235.1 |
| 8,060,644 B1 | 11/2011 | Michailidis et al. |
| 8,078,743 B2 | 12/2011 | Sharp et al. |
| 8,125,902 B2 | 2/2012 | Rochon et al. |
| 8,149,710 B2 | 4/2012 | Bergamasco et al. |
| 8,270,295 B2 | 9/2012 | Kendall et al. |
| 8,274,971 B2 | 9/2012 | Battle et al. |
| 8,345,548 B2 | 1/2013 | Gusat et al. |
| 8,352,648 B1 | 1/2013 | Puranik |
| 8,473,693 B1 | 6/2013 | Muppalaneni et al. |
| 8,478,811 B2 | 7/2013 | Garg et al. |
| 8,565,092 B2 | 10/2013 | Arumilli et al. |
| 8,576,715 B2 | 11/2013 | Bloch et al. |
| 8,589,587 B1 | 11/2013 | Michailidis et al. |
| 8,599,868 B2 | 12/2013 | Sindhu et al. |
| 8,630,294 B1 | 1/2014 | Keen et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,705,349 B2 | 4/2014 | Bloch et al. |
| 8,730,982 B2 | 5/2014 | Wu et al. |
| 8,738,860 B1 | 5/2014 | Griffin et al. |
| 8,762,595 B1 | 6/2014 | Muller et al. |
| 8,767,561 B2 | 7/2014 | Gnanasekaran et al. |
| 8,811,183 B1 | 8/2014 | Anand et al. |
| 8,838,882 B1 | 9/2014 | Quong |
| 8,879,396 B2 | 11/2014 | Guay |
| 8,923,337 B2 | 12/2014 | Singh |
| 8,989,017 B2 | 3/2015 | Naouri et al. |
| 8,995,265 B2 | 3/2015 | Basso et al. |
| 9,013,999 B1 | 4/2015 | Kondapalli |
| 9,014,006 B2 | 4/2015 | Haramaty et al. |
| 9,130,885 B1 | 9/2015 | Bukspan et al. |
| 9,210,095 B2 | 12/2015 | Basso et al. |
| 9,325,619 B2 | 4/2016 | Guay et al. |
| 9,325,641 B2 | 4/2016 | Haramaty et al. |
| 9,356,868 B2 | 5/2016 | Tabatabaee et al. |
| 9,426,085 B1 | 8/2016 | Anand et al. |
| 9,497,125 B2 | 11/2016 | Raindel et al. |
| 9,563,361 B1 | 2/2017 | Asiot et al. |
| 9,584,429 B2 | 2/2017 | Haramaty et al. |
| 9,648,148 B2 | 5/2017 | Rimmer et al. |
| 9,699,095 B2 | 7/2017 | Elias et al. |
| 9,742,683 B1 | 8/2017 | Vanini |
| 9,742,702 B1 | 8/2017 | Bukspan et al. |
| 9,762,491 B2 | 9/2017 | Gafni et al. |
| 9,807,024 B2 | 10/2017 | Shpiner et al. |
| 10,050,896 B2 | 8/2018 | Yang et al. |
| 10,069,701 B2 | 9/2018 | Elias et al. |
| 10,069,748 B2 | 9/2018 | Shpiner et al. |
| 10,084,716 B2 | 9/2018 | Gafni |
| 10,205,683 B2 | 2/2019 | Elias et al. |
| 10,237,376 B2 | 3/2019 | Crupnicoff et al. |
| 10,250,530 B2 | 4/2019 | Aibester et al. |
| 10,387,074 B2 | 8/2019 | Kriss et al. |
| 10,530,846 B2 | 1/2020 | Jung |
| 10,728,156 B2 | 7/2020 | Kwan et al. |
| 10,778,568 B2 | 9/2020 | Levy et al. |
| 10,951,549 B2 | 3/2021 | Elias et al. |
| 10,999,221 B2 | 5/2021 | Gafni et al. |
| 11,099,891 B2 | 8/2021 | Baldocchi et al. |
| 11,218,413 B2 | 1/2022 | Shpigelman et al. |
| 11,296,988 B2 | 4/2022 | Shpigelman et al. |
| 11,470,010 B2 | 10/2022 | Mula et al. |
| 11,563,695 B2 | 1/2023 | Mitulal et al. |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0039350 A1* | 4/2002 | Wang ..................... H04L 47/20 370/230.1 |
| 2002/0055993 A1 | 5/2002 | Shah et al. |
| 2002/0067695 A1 | 6/2002 | Skarpness et al. |
| 2002/0087723 A1 | 7/2002 | Williams et al. |
| 2002/0176430 A1 | 11/2002 | Sangha et al. |
| 2002/0176432 A1 | 11/2002 | Courtney et al. |
| 2002/0191559 A1 | 12/2002 | Chen et al. |
| 2003/0016628 A1 | 1/2003 | Kadambi et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0065812 A1 | 4/2003 | Beier et al. |
| 2003/0076849 A1 | 4/2003 | Morgan et al. |
| 2003/0095560 A1 | 5/2003 | Arita et al. |
| 2003/0108010 A1 | 6/2003 | Kim et al. |
| 2003/0112817 A1* | 6/2003 | Woo ..................... H04L 47/20 370/413 |
| 2003/0117958 A1 | 6/2003 | Nation et al. |
| 2003/0118016 A1 | 6/2003 | Kalkunte et al. |
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0179765 A1 | 9/2003 | Goetzinger et al. |
| 2003/0198231 A1 | 10/2003 | Kalkunte et al. |
| 2003/0198241 A1 | 10/2003 | Putcha et al. |
| 2003/0200330 A1 | 10/2003 | Oelke et al. |
| 2003/0217184 A1 | 11/2003 | Nair |
| 2003/0222860 A1 | 12/2003 | Yamaura |
| 2003/0223368 A1 | 12/2003 | Allen et al. |
| 2003/0223435 A1 | 12/2003 | Gil |
| 2004/0008714 A1 | 1/2004 | Jones |
| 2004/0027989 A1 | 2/2004 | Martin et al. |

(56) References Cited

U.S. PATENT DOCUMENTS

| | | |
|---|---|---|
| 2004/0037558 A1 | 2/2004 | Beshasi |
| 2004/0066785 A1 | 4/2004 | He et al. |
| 2004/0081090 A1 | 4/2004 | Hara et al. |
| 2004/0202169 A1 | 10/2004 | Mukouyama et al. |
| 2005/0053077 A1 | 3/2005 | Blanc et al. |
| 2005/0063370 A1 | 3/2005 | Beshai et al. |
| 2005/0076138 A1 | 4/2005 | Sterne |
| 2005/0094643 A1 | 5/2005 | Wang et al. |
| 2005/0125424 A1 | 6/2005 | Herriott et al. |
| 2005/0129033 A1 | 6/2005 | Gordy et al. |
| 2005/0135356 A1 | 6/2005 | Muthukrishnan et al. |
| 2005/0169172 A1 | 8/2005 | Wang et al. |
| 2005/0204103 A1 | 9/2005 | Dennison |
| 2005/0216822 A1 | 9/2005 | Kyusojin et al. |
| 2005/0223139 A1 | 10/2005 | Wagh et al. |
| 2005/0226156 A1 | 10/2005 | Keating et al. |
| 2005/0228900 A1 | 10/2005 | Stuart et al. |
| 2005/0259574 A1 | 11/2005 | Figueira et al. |
| 2006/0008803 A1 | 1/2006 | Brunner et al. |
| 2006/0034172 A1 | 2/2006 | Morton |
| 2006/0087989 A1 | 4/2006 | Gai et al. |
| 2006/0088036 A1 | 4/2006 | De Prezzo |
| 2006/0092837 A1 | 5/2006 | Kwan et al. |
| 2006/0092842 A1 | 5/2006 | Beukema et al. |
| 2006/0092845 A1 | 5/2006 | Kwan et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2006/0251109 A1 | 11/2006 | Muller et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0041385 A1 | 2/2007 | Sali et al. |
| 2007/0053350 A1 | 3/2007 | Spink et al. |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0147292 A1 | 6/2007 | Van Ewijk et al. |
| 2007/0201499 A1 | 8/2007 | Kapoor et al. |
| 2007/0274215 A1 | 11/2007 | Gusat et al. |
| 2007/0291644 A1 | 12/2007 | Roberts et al. |
| 2007/0297453 A1 | 12/2007 | Niinomi |
| 2008/0037420 A1 | 2/2008 | Tang et al. |
| 2008/0114893 A1 | 5/2008 | Youn et al. |
| 2008/0144670 A1 | 6/2008 | Gooossens et al. |
| 2008/0175146 A1 | 7/2008 | Van Leekwuck et al. |
| 2008/0192764 A1 | 8/2008 | Arefi et al. |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0073881 A1 | 3/2009 | Cui |
| 2009/0122702 A1* | 5/2009 | Chew .................. H04L 47/70 370/235 |
| 2009/0161684 A1 | 6/2009 | Voruganti et al. |
| 2009/0178140 A1 | 7/2009 | Cao et al. |
| 2009/0182944 A1 | 7/2009 | Comparan et al. |
| 2009/0207848 A1 | 8/2009 | Kwan et al. |
| 2010/0057953 A1 | 3/2010 | Kim et al. |
| 2010/0061238 A1 | 3/2010 | Godbole et al. |
| 2010/0061390 A1 | 3/2010 | Godbole et al. |
| 2010/0067539 A1* | 3/2010 | Lin ...................... H04L 49/90 370/463 |
| 2010/0088756 A1 | 4/2010 | Balakrishnan et al. |
| 2010/0100670 A1 | 4/2010 | Jeddeloh |
| 2010/0165842 A1 | 7/2010 | Wang et al. |
| 2010/0220742 A1 | 9/2010 | Brewer et al. |
| 2010/0322076 A1 | 12/2010 | Goel |
| 2010/0325318 A1 | 12/2010 | Desoli et al. |
| 2011/0058571 A1 | 3/2011 | Bloch et al. |
| 2011/0286468 A1* | 11/2011 | Tomonaga ............ H04L 47/10 370/412 |
| 2012/0072635 A1 | 3/2012 | Yoshida et al. |
| 2012/0106562 A1 | 5/2012 | Laor et al. |
| 2012/0106567 A1* | 5/2012 | Hanes .................. H04L 47/522 370/412 |
| 2012/0144064 A1 | 6/2012 | Parker et al. |
| 2012/0155256 A1 | 6/2012 | Pope et al. |
| 2012/0155264 A1 | 6/2012 | Sharma et al. |
| 2012/0163396 A1 | 6/2012 | Cheng et al. |
| 2013/0014118 A1 | 1/2013 | Jones |
| 2013/0021354 A1 | 1/2013 | Van Eerd et al. |
| 2013/0039178 A1 | 2/2013 | Chen et al. |
| 2013/0077489 A1 | 3/2013 | Bloch et al. |
| 2013/0212296 A1 | 8/2013 | Goel et al. |
| 2013/0239119 A1 | 9/2013 | Garg et al. |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0036680 A1 | 2/2014 | Lih et al. |
| 2014/0036930 A1 | 2/2014 | Lih et al. |
| 2014/0095745 A1 | 4/2014 | Kawahara |
| 2014/0133314 A1 | 5/2014 | Mathews et al. |
| 2014/0140206 A1 | 5/2014 | Hendel et al. |
| 2014/0155043 A1 | 6/2014 | Gell et al. |
| 2014/0192646 A1 | 7/2014 | Mir et al. |
| 2014/0204742 A1 | 7/2014 | Pandit |
| 2014/0269274 A1 | 9/2014 | Banavalikar et al. |
| 2014/0269324 A1 | 9/2014 | Tietz et al. |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0026361 A1 | 1/2015 | Matthews et al. |
| 2015/0058857 A1 | 2/2015 | Sandstorm |
| 2015/0095568 A1 | 4/2015 | Lamb et al. |
| 2015/0103667 A1 | 4/2015 | Elias |
| 2015/0124611 A1 | 5/2015 | Attar et al. |
| 2015/0127797 A1 | 5/2015 | Attar et al. |
| 2015/0163146 A1 | 6/2015 | Zhang et al. |
| 2015/0180782 A1 | 6/2015 | Rimmer et al. |
| 2015/0180790 A1 | 6/2015 | Rimmer et al. |
| 2015/0200866 A1 | 7/2015 | Pope et al. |
| 2015/0371607 A1 | 12/2015 | Holland et al. |
| 2015/0381505 A1 | 12/2015 | Sundararaman et al. |
| 2016/0135076 A1 | 5/2016 | Grinshpun et al. |
| 2016/0173383 A1 | 6/2016 | Liu et al. |
| 2016/0191392 A1 | 6/2016 | Liu |
| 2016/0226951 A1 | 8/2016 | Talpey et al. |
| 2016/0294715 A1 | 10/2016 | Raindel et al. |
| 2016/0337257 A1 | 11/2016 | Yifrach et al. |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1 | 10/2017 | Cheng et al. |
| 2017/0373989 A1 | 12/2017 | Gafni et al. |
| 2018/0063030 A1 | 3/2018 | Mitulal et al. |
| 2018/0063038 A1 | 3/2018 | Ghanwani et al. |
| 2018/0091388 A1 | 3/2018 | Levy et al. |
| 2018/0115498 A1 | 4/2018 | Sundaram et al. |
| 2018/0205653 A1 | 7/2018 | Wang et al. |
| 2018/0241677 A1 | 8/2018 | Srebro et al. |
| 2018/0278550 A1 | 9/2018 | Rosen et al. |
| 2018/0302328 A1 | 10/2018 | Keith et al. |
| 2019/0042443 A1 | 2/2019 | Maciejewski et al. |
| 2019/0042513 A1 | 2/2019 | Fleming, Jr. et al. |
| 2019/0044874 A1 | 2/2019 | Zhang et al. |
| 2020/0177521 A1 | 6/2020 | Blumrich et al. |
| 2020/0280518 A1 | 9/2020 | Lee et al. |
| 2021/0006502 A1 | 1/2021 | Zhou et al. |
| 2021/0344600 A1 | 11/2021 | Urman et al. |
| 2021/0377074 A1* | 12/2021 | Yoshida ............ H04L 12/40104 |
| 2022/0045972 A1 | 2/2022 | Aibester et al. |
| 2022/0231933 A1 | 7/2022 | Mannor et al. |

(56) References Cited

U.S. PATENT DOCUMENTS

| | | | |
|---|---|---|---|
| 2023/0068902 A1 | 3/2023 | Seely et al. | |
| 2023/0137826 A1* | 5/2023 | Ajami | H04L 5/0098 370/329 |

FOREIGN PATENT DOCUMENTS

| | | |
|---|---|---|
| EP | 1698976 A1 | 9/2006 |
| EP | 1720295 A1 | 11/2006 |
| EP | 2466476 A1 | 6/2012 |
| WO | 03024033 A1 | 3/2003 |
| WO | 2009107089 A2 | 9/2009 |
| WO | 2013136355 A1 | 9/2013 |
| WO | 2013180691 A1 | 12/2013 |
| WO | 2018044426 A1 | 3/2018 |
| WO | 2018106868 A1 | 6/2018 |
| WO | 2019029318 A1 | 2/2019 |

OTHER PUBLICATIONS

Pfister et al., "Hot Spot Contention and Combining in Multistage Interconnect Networks", IEEE Transactions on Computers, vol. C-34, pp. 943-948, Oct. 1985.
Zhu et al.,"Congestion control for large-scale RDMA deployments", SIGCOMM, ACM, pp. 523-536, Aug. 17-21, 2015.
Cisco Systems, Inc., "Advantage Series White Paper Smart Buffering", pp. 1-16, year 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06, pp. 1-23, Mar. 18, 2016.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, issue 2, pp. 130-140, Apr. 1998.
Huawei Technologies Co., Ltd., Baidu, Inc., "The Lossless Network for Data Centers," Revision 1.0, pp. 1-15, Nov. 7, 2017.
IEEE Standard 802.1Q™-2005, "IEEE Standard for Local and metropolitan area networks Virtual Bridged Local Area Networks", pp. 1-303, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for Pause Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", pp. 1-40, Sep. 30, 2011.
Cisco Systems, Inc., "Priority Flow Control: Build Reliable Layer 2 Infrastructure", pp. 1-8 pages, year 2015.
Aibester et al., U.S. Appl. No. 17/955,591, filed Sep. 29, 2022.
Mula et al., U.S. Appl. No. 17/902,936, filed Sep. 5, 2022.
U.S. Appl. No. 17/503,383 Office Action dated Nov. 4, 2022.
Infiniband Architecture Release 1.2.1, vol. 1, General specifications, Chapter 7.9, pp. 212-216, Nov. 2007.
Raatikainen, P., "ATM Switches—Switching Technology S38.3165", Switching Technology, L8-1, 34 pages, year 2006 (http://www.netlab.hut.fi/opetus/s383165).
Fahmy, S., "A Survey of ATM Switching Techniques", Department of Computer and Information Science, The Ohio State University, USA, pp. 1-22m Aug. 21, 1995 downloaded from http://www.cs.purdue.edu/homes/fahmy/cis788.08Q/atmswitch.html.
Minkenberg et al., "Multistage Interconnection Networks for Data Centers; Bidirectional Fat Tree Construction and Routing for IEEE 802.1au", IBM Research GmbH, Zurich, Switzerland, pp. 1-9, Jul. 2, 2007.
Bwalya et al., "Performance Evaluation of Buffer Size for Access Networks in First Generation Optical Networks", International Journal of Internet of Things, vol. 6, issue 3, pp. 98-105, year 2017.
"Understanding CoS Priority Group and Queue Guaranteed Minimum Bandwidth," Traffic Management User Guide (QFX Series and EX4600 Switches), juniper.net, pp. 1-4, Feb. 1, 2021, as downloaded from https://www.juniper.net/documentation/us/en/software/junos/traffic-mgmt-qfx/topics/concept/cos-qfx-series-guaranteed-bandwidth-understanding.html.
"QoS Modular Qos Command—Line Interface Configuration Guide, Cisco IOS Xe Fuji 16.8x," Cisco, pp. 1-25, Apr. 20, 2018, as downloaded from https://www.cisco.com/c/en/us/td/docs/ios-xml/ios/qos_mqc/configuration/xe-16-8/qos-mqc-xe-16-8-book/qos-limits-wred.html.
Mula et al., U.S. Appl. No. 17/175,716, filed Feb. 15, 2021.
Aibester et al., U.S. Appl. No. 17/503,383, filed Oct. 18, 2021.
Ramakrishnan et al., "The Addition of Explicit Congestion Notification (ECN) to IP," Request for Comments (RFC) 3168, The Internet Society, pp. 1-63, Sep. 2001.
Spitulski, U.S. Appl. No. 17/840,371, filed Jun. 14, 2022.
Kadosh et al., U.S. Appl. No. 17/348,801, filed Jun. 16, 2021.
U.S. Appl. No. 17/175,716 Office Action dated Jun. 22, 2022.
U.S. Appl. No. 17/503,383 Office Action dated Jun. 8, 2023.
U.S. Appl. No. 17/503,383 Office Action dated Aug. 17, 2023.
U.S. Appl. No. 17/902,936 Office Action dated May 16, 2024.
U.S. Appl. No. 17/895,108 Office Action dated Jan. 6, 2025.
CN Application # 2021108967450 Office Action dated Sep. 8, 2023.
U.S. Appl. No. 17/588,385 Office Action dated Oct. 5, 2023.
U.S. Appl. No. 17/902,936 Office Action dated Oct. 25, 2023.

* cited by examiner

QUEUE BANDWIDTH ESTIMATION FOR MANAGEMENT OF SHARED BUFFERS AND ALLOWING VISIBILITY OF SHARED BUFFER STATUS

FIELD OF THE INVENTION

The present invention relates generally to communication networks, and particularly to prioritized allocation of shared buffer resources to queues.

BACKGROUND OF THE INVENTION

In communication networks, streams of packets, or corresponding descriptors or pointers, are often temporarily stored in queues or buffers.

U.S. Pat. No. 5,014,265 describes a method of controlling congestion in a virtual circuit packet network. An initial packet buffer is assigned to each virtual circuit at each node into which incoming packets are stored and later removed for forward routing. If a larger buffer is desired for a virtual circuit to service a larger amount of data, then additional buffer space is dynamically allocated selectively to the virtual circuit on demand if each node has sufficient unallocated buffer space to fill the request. In one embodiment, the criterion for dynamic allocation is based on the amount of data buffered at the data source. In alternative embodiments, the criteria for dynamic allocation may be further based on the amount of data buffered at each node for a virtual circuit and the total amount of free buffer space at each node of a virtual circuit.

U.S. Pat. No. 5,541,912 discloses A dynamic threshold system and method for allocating memory among different output queues in a shared-memory ATM switch. The maximum permissible length for any individual queue at any instant of time is a function of the unused buffering in the switch. The dynamic threshold system and method deliberately reserves a small amount of buffer space, not allocating it to any currently active output queue, but attempts to equally share the remaining buffer space among the currently active output queues. The dynamic threshold system and method improve fairness and switch efficiency by guaranteeing access to the buffer space for all output queues, and by preventing any single output queue from monopolizing the memory at the expense of the others. The dynamic threshold system and method adapt to uncertain or changing load conditions.

SUMMARY OF THE INVENTION

An embodiment of the present invention that is described herein provides a network device including a memory and a memory management circuit. The memory is to store a shared buffer. The memory management circuit is to estimate respective bandwidth measures for one or more queues used in processing packets in the network device, and to allocate and deallocate segments of the shared buffer to at least one of the queues based on the bandwidth measures.

In some embodiments, the memory management circuit is to measure a size of data that is written to the one or more of the queues, and to estimate the respective bandwidth measures in accordance with the size of data. In some embodiments, the memory management circuit is to measure a size of data that is read from the one or more of the queues, and to estimate the respective bandwidth measures in accordance with the size of data.

In an embodiment, the memory management circuit is to allocate one or more segments of the shared buffer to a given queue responsively to a comparison of a bandwidth measure of the given queue and a preset maximum bandwidth limit. In another embodiment, the memory management circuit is to deallocate one or more segments of the shared buffer from a given queue responsively to a comparison of a bandwidth measure of the given queue and a preset minimum bandwidth limit.

In yet another embodiment, the memory management circuit is to assign a quota of segments of the shared buffer to a given queue in accordance with a bandwidth measure of the given queue, and to allocate the segments of the shared buffer to the given queue from the assigned quota. In still another embodiment, the memory management circuit is to assign a quota of segments of the shared buffer to a given queue in accordance with a bandwidth measure of the given queue, and to allocate reserved segments of the memory to the given queue from the quota.

In a disclosed embodiments, the bandwidth measures include one or more bandwidth histograms. In an example embodiment, the memory management circuit is to generate an interrupt responsively to a bandwidth measure of a queue. In an embodiment, the memory management circuit is to modify an allocation of segments of the shared buffer to a first queue, in response to a bandwidth measure of a second queue that shares a common resource with the first queue. In an example embodiment, the common resource is a shared-buffer pool. In an embodiment, the memory management circuit is to modify a congestion control algorithm responsively to a bandwidth measure.

There is additionally provided, in accordance with an embodiment that is described herein, a network device including multiple ports and a processor. The multiple ports are to communicate packets over a network. The processor is to estimate respective bandwidth measures for one or more queues used in processing the packets in the network device, and to output information indicative of the bandwidth measures.

There is further provided, in accordance with an embodiment that is described herein, a method including estimating respective bandwidth measures for one or more queues used in processing packets in a network device. Segments of a shared buffer of the network device are allocated and deallocated to at least one of the queues, based on the bandwidth measures.

There is also provided, in accordance with an embodiment that is described herein, a method including estimating respective bandwidth measures for one or more queues used in processing the packets in a network device. Information indicative of the bandwidth measures is output.

There is additionally provided, in accordance with an embodiment that is described herein, a method a network device. The method includes processing packets in the network device using one or more queues. Bandwidth measures are estimated for one or more of the queues. Based on the bandwidth measures, segments of a shared buffer of the network device are allocated and deallocating to at least one of the queues.

The present invention will be more fully understood from the following detailed description of the embodiments thereof, taken together with the drawings in which:

DETAILED DESCRIPTION OF EMBODIMENTS

Overview

Network devices, such as network switches, network routers, Network Interface Controllers (NICs), Host Channel Adapters (HCAs) and others, communicate packets over a communication network (e.g., Ethernet or InfiniBand™).

In a network device, the packets may be logically arranged in queues and temporarily stored in memory buffers. At least some of the memory may be shared between a plurality of queues. In high performance systems, the various concurrent queues may be managed in parallel and, hence, a plurality of queues may sometimes compete over a limited shared memory space.

To prioritize between queues that compete for the shared memory, various criteria can be used to allocate memory space to queues (and to deallocate memory space form other queues), including, for example, queue occupancy, the Quality of Service (QoS) of the respective flow of packets, a queue occupancy measure, various far-allocation policies, and others.

In accordance with such allocation criteria, network devices may allocate more space to a queue when the occupancy of the queue reaches a predefined threshold; the threshold would be set so that the queue will not overflow (e.g., exceed a maximum capacity) during the period starting when the threshold is exceeded to the time that the queue receives additional memory space ("the memory allocation response time"). In that respect, it may be beneficial to prioritize queues based on the bandwidths of the queues for better shared-buffer algorithm performance. For example, a high bandwidth queue is more likely to overflow during the memory allocation response time than a low bandwidth queue.

Embodiments of the present invention that are disclosed herein provide network devices and methods that use queue bandwidth as a shared-memory allocation criterion, possibly in combination with one or more other the shared-memory allocation criteria. Thus, a high bandwidth queue, which may quickly exhaust its allocated memory space, will be prioritized when competing for the allocation of additional memory resources.

In some embodiments, a memory management circuit (MMC) in the network device comprises circuitry to measure the bandwidth of queues. In an embodiment, the MMC comprises a memory access control circuit (MAC), which multiplexes the parallel memory access channels to bursts of data directed to the single read/write port of the shared memory; the MAC indicates the size of the data that is transferred in each burst and the ID of the corresponding queue. Bandwidth accumulators then accumulate the data sizes, independently for each queue. The accumulated data size in each time period is indicative of the bandwidth of the queue; in some embodiments the accumulation is further filtered, to achieve a smooth bandwidth vs. time relationship for the queues.

In embodiments, the measured queue bandwidth is used by the MMC as a criterion to increase or decrease the memory space allocated to the queue. Thus, for example, two queues having the same occupancy level but different bandwidths may be allocated different amounts of memory space (since the queue having the larger bandwidth is likely to exhaust its allocated memory space more quickly).

In another embodiment, the bandwidths that the MMC measures may be exposed to users, in the form of high or low bandwidth alerts, bandwidth reports, bandwidth histograms and others.

System Description

Network devices typically communicate (i.e., send and/or receive) packets, in a plurality of concurrent streams, over a communication network. In the network device, the streams may be logically handled by queues, and the network device may temporarily store packets corresponding to queues in a shared memory.

The shared memory is typically a limited resource, and the network processor device would typically attempt to manage the allocation of the shared memory between the queues in an optimal manner, according to a set of criteria, including queue occupancy, Quality of Service (QoS) class and others.

According to embodiments of the present invention, an important criterion for the allocation and deallocation of shared memory space to queues is the bandwidth of the queue (measured, for example, in Mbyte per second). Thus, a high bandwidth queue, which is likely to rapidly fill-up a large space in memory (in case the emptying of the filled data is delayed or slow), will be allocated a larger space in memory.

Figure 1:
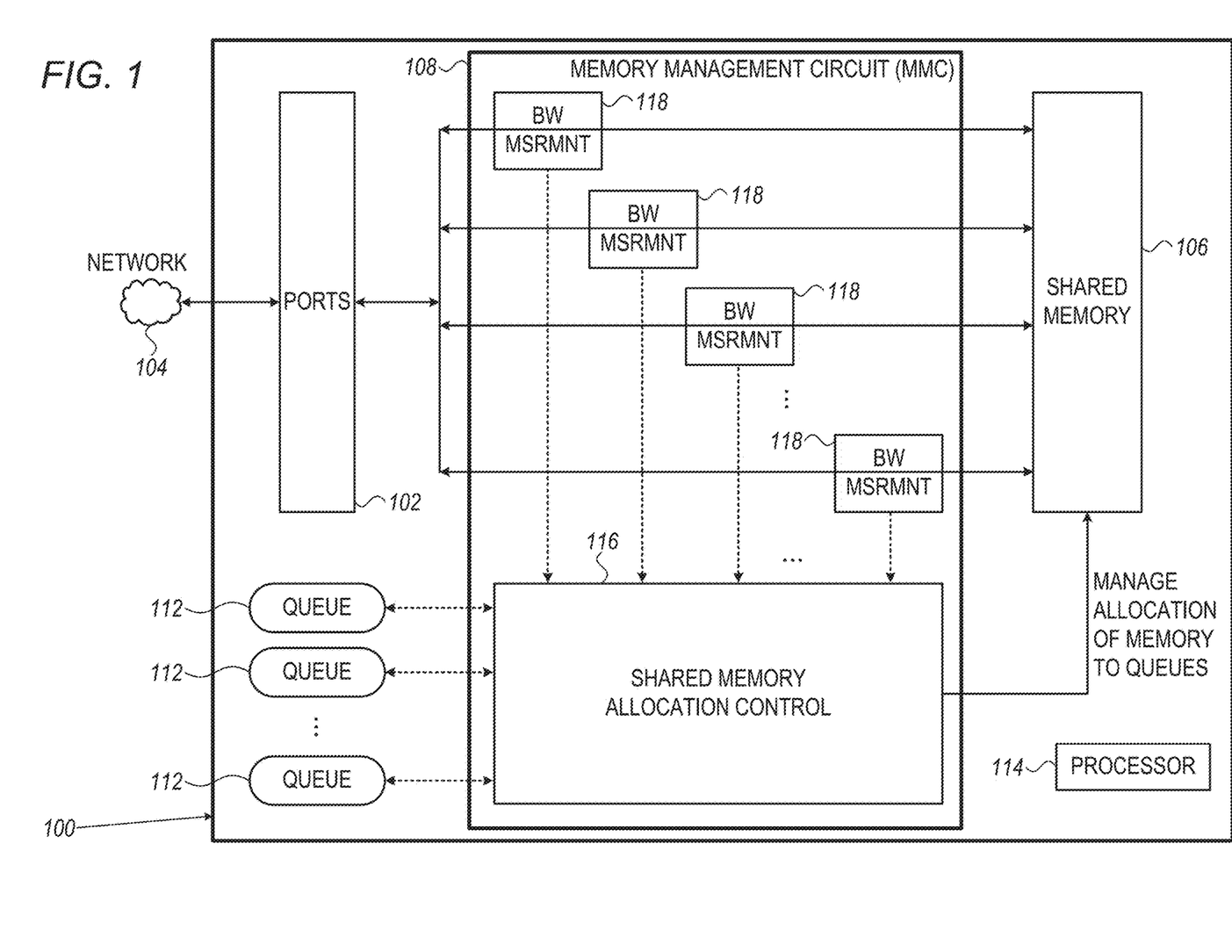
FIG. 1 is a block diagram that schematically illustrates a network device, in accordance with an embodiment of the present invention.

FIG. 1 is a block diagram that schematically illustrates a network device 100, in accordance with an embodiment of the present invention. Network device 100 may be a switch, a bridge, a router, or a network interface such as a network interface controller (NIC) or a host channel adapter (HCA). The network device comprises Ports 102, including ingress and egress ports, which communicate packets over a communication network 104 (e.g., Ethernet or InfiniBand™). Ports 102 typically comprise physical layer (PHY) and media access control (MAC) interface circuits, as are known in the art.

Network device 100 further comprises a shared memory 106, a memory management circuit (MMC) 108, a plurality of queue circuits 112 and a processor 114, which controls the operation of the network device. Other components of network device 100 are omitted, for the sake of simplicity.

Network device 100 allocates packets that are communicated over the network to queue circuits 112 and may temporarily store the packets in buffers in shared memory 106. The buffers in shared memory 106 are also referred to herein collectively as a "shared buffer". Memory management circuit (MMC) 108, which is coupled to the queue circuits, allocates space (e.g., segments) of the shared memory (i.e., of the shared buffer) to some queues and deallocates space from other queues, according to a set of criteria.

According to the example embodiment illustrated in FIG. 1, one of the criteria to allocate memory space (e.g., memory segments) to the queues (or deallocate memory space from the queues) is the bandwidth of the queue. Towards that end, MMC 108 comprises a shared memory allocation control circuit 116, and a plurality of bandwidth measurement circuits 118, which measure the respective memory access bandwidths of queues (all queues or a subset of the queues, e.g., queues with high QoS). The bandwidths of the queues are input to the shared memory allocation control, which may use the bandwidth measurements when deciding to allocate more memory to the queue, or when deciding to deallocate memory from the queue.

In some embodiments, the bandwidth measurement of a first queue may affect memory allocations of other queues, for example, if the first queue and the other queues share a common resource (e.g., a shared-buffer pool). Thus, according to the example embodiment illustrated in FIG. 1 and described above, a network device measures the bandwidth of one or more of the queues and may use the measured bandwidths as a criterion for allocating shared memory to the corresponding queues.

Figure 2A:
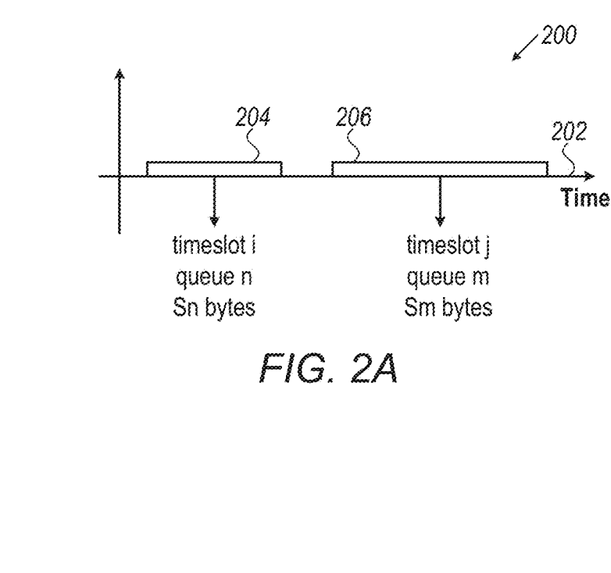
FIG. 2A is a timing diagram that schematically illustrates memory accessing of a single port shared memory, in accordance with an embodiment of the present invention.

The configuration of network device 100 is an example configuration that is cited by way of example; other suitable structures may be used in alternative embodiments. For example, in some embodiments the network device measures the bandwidth at the memory ports (see, for example, FIG. 2 below); in some embodiments the shared memory is distributed among the ports. In an embodiment, processor 114 is a plurality of processors.

Although the description above refers to egress queues, the disclosed techniques may be applied to ingress and/or egress queues, including virtual queues.

Bandwidth Measurement

Several techniques may be used for measuring the bandwidths of the queues. We will disclose below one such technique, according to an embodiment of the present invention.

In some embodiments, shared memory 106 includes a single port for writing and reading data, and data flow from the various sources is multiplexed when written to the memory; similarly, data read from the memory is demultiplexed to the various data sinks. We will refer to the time-period during which a single queue writes or exchanges data with the shared memory as a timeslot. Queue bandwidth may conveniently be measured by monitoring the memory traffic related to the queue; the time-period may be measured, for example, from the time that a packet is written to a buffer to the time that the packet is read from the buffer; for another example, the time-period may be measured from the time packet processing starts to the time that the packer egresses the scheduler.

FIG. 2A is a timing diagram 200 that schematically illustrates memory accessing of a single port shared memory, in accordance with an embodiment of the present invention. Timing events are drawn along a time axis 202, and include a first timeslot 204, in which the transfer of data pertaining to a queue n take place, followed by a second timeslot 206, in which the transfer of data pertaining to queue m takes place. The size of data transferred during the first timeslot is designated Sn, and the size of data in the second timeslots is designated Sm. In an embodiment, the bandwidths of queues n and m can be estimated by accumulating the corresponding Sn and Sm.

Figure 2B:
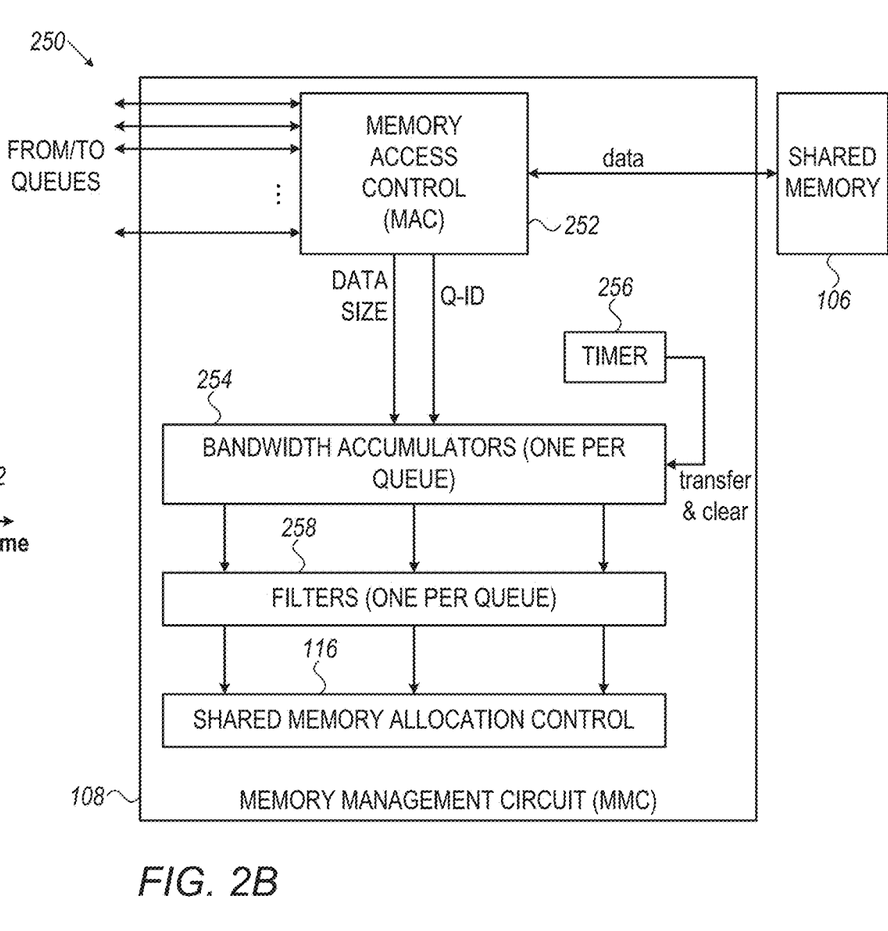
FIG. 2B is a block diagram that schematically illustrates queue bandwidth measurement in a network device, in accordance with an embodiment of the present invention.

FIG. 2B is a block diagram 250 that schematically illustrates queue bandwidth measurement in a network device, in accordance with an embodiment of the present invention. MMC 108 (FIG. 1) comprises a memory access control circuit (MAC) 252, which multiplexes data to be written into memory from the various queues. For example, the MAC may transfer data pertaining to a queue n to a corresponding segment of the shared memory at a first timeslot, and data pertaining to queue m at a second timeslot.

According to the example embodiment illustrated in FIG. 2B, MAC 252 sends, after each timeslot, a queue-ID indication and a data-size indication to bandwidth accumulators 254, which accumulate the data sizes separately for each of the queues. A timer 256 sends a transfer-and-clear trigger output to the accumulators every preset time-period (e.g., every 1 mS). The accumulators, responsively to the trigger input, send the current accumulation results for all the queues to filters 258, and clear the accumulators, to start a new count.

The accumulated data sizes for each period in the time between the triggers is indicative of the bandwidth of the queues; however, in embodiments, the bandwidth-time function obtained by accumulating the data sizes at a predefined periods may not be suitable for memory allocation purpose (for example, the bandwidth-time function may include high-frequency glitches). In some embodiments, filters 258 may shape the bandwidth-time function, e.g., by applying finite-impulse-response (FIR) filtering, infinite impulse response (IIR) filtering or other suitable filtering. Filters 258 output the shaped bandwidth functions of the queues to shared memory allocation control 116 (FIG. 1). As explained above, the shared memory allocation control may then use the bandwidths to determine allocation of shared memory space to the queues.

The configuration and the circuits used for bandwidth management, illustrated in FIG. 2B and described hereinabove, are examples that are cited by way of example. Other suitable structures and circuits may be used in alternative embodiments. For example, in some embodiments, MAC 252 may transfer long bursts of data to the shared memory for some or for all the queues, and a temporal bandwidth measure for the queue may be calculated by dividing the data size by the timeslot duration. In some embodiments, bandwidth may be measured based on bytes per second, packets per second and/or fragments per second.

In embodiments, accumulators 254 and/or filters 256 are omitted and, instead, a processor (e.g., processor 114, FIG. 1) receives timeslot data from the MAC, and calculates the bandwidths of the queues.

Figure 3:
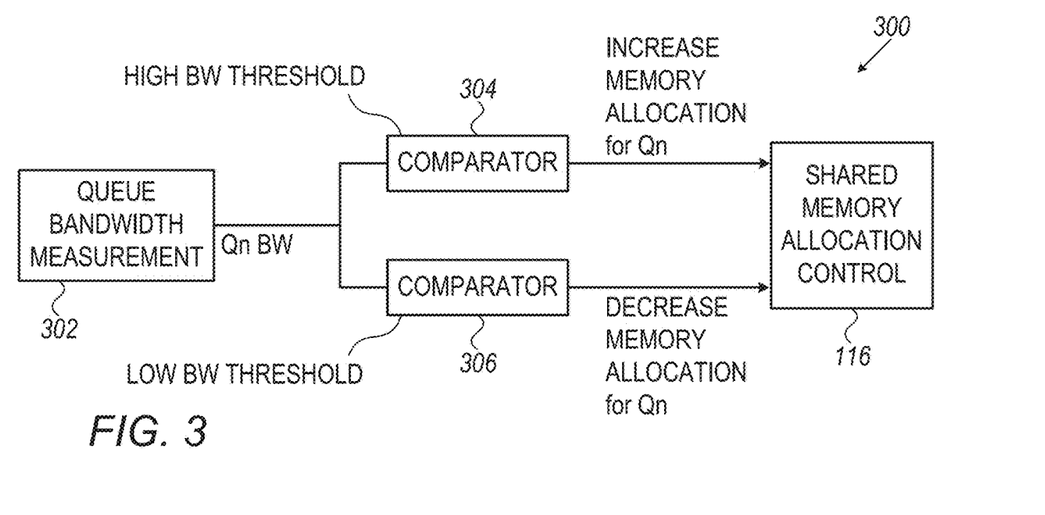
FIG. 3 is a block diagram that schematically illustrates circuitry to allocate shared memory space responsively to queue bandwidth measurements, in accordance with an embodiment of the present invention.

FIG. 3 is a block diagram 300 that schematically illustrates circuitry to allocate shared memory space responsively to queue bandwidth measurements, in accordance with an embodiment of the present invention. In an embodiment, circuitry 300 is included in MMC 108 (FIG. 1). A queue bandwidth measurement circuit 302 measure the bandwidths of queues, for example, by accumulating data sizes transferred by MAC 252 (FIG. 2B).

According to the example embodiment illustrated in FIG. 3, the measured bandwidth of Qn is input to a high-limit comparator 304, which compares the bandwidth to a high threshold, and to a low-limit comparator 306, which compares the bandwidth to a low threshold. If the bandwidth is higher than the high threshold, comparator 304 signals to shared memory allocation control 116 (FIG. 1) that the memory allocation of Qn should be increased, to avoid rapid overflows that may occur as a result of the high bandwidth. If the bandwidth is lower than the low threshold, comparator 306 signals to the shared memory allocation control that the memory space allocated to Qn may be decreased (e.g., returned to a pool, and, subsequently, allocated to other queues).

As explained above, shared memory allocation control 116 may use additional criteria to allocate memory spaces to queues (and to deallocate memory space from queues), including, for example, queue occupancy, QoS, congestion notifications, and others. The decision to allocate additional space to a queue, or to deallocate space from a queue is taken considering the inputs from comparators 302, 306, and considering other criteria.

Thus, according to the example embodiment illustrated in FIG. 3 and described above, the bandwidth of a queue and, more specifically, the comparison of the bandwidth to thresholds, may be used to increase or decrease the memory space allocated to the queue.

The configuration of the circuits illustrated in FIG. 3 and described above is an example that is cited for conceptual clarity. Other suitable configurations may be used in alternative embodiments. For example, in embodiments, comparators 304 and 306 are implemented in software; in some embodiments the bandwidth value is linearly weighted with other criteria when considering allocation or deallocation of memory space. In an embodiment, a programmable allocation function is implemented, with the queue bandwidth being one of the parameters of the function.

Types of Queues and Queue Attributes

The techniques described herewith may be applied to a variety of queues and queue types in network devices. Such queues may include transmit queues, receive queues and flexible queues. Separate queues may be used for each priority group and for each QoS. Some queues are defined collectively for communication flows and may include both receive and transmit queues.

In some embodiments, a set of attributes is defined for each queue; the attributes may include, among others, the type of the queue, a related port, a related priority group and a bandwidth attribute, which the MMC may update whenever the MMC measures a new bandwidth value. In some embodiments, queue attributes may include a queue bandwidth status, e.g., queue bandwidth is above a preset maximum, or below a preset minimum.

Figure 4:
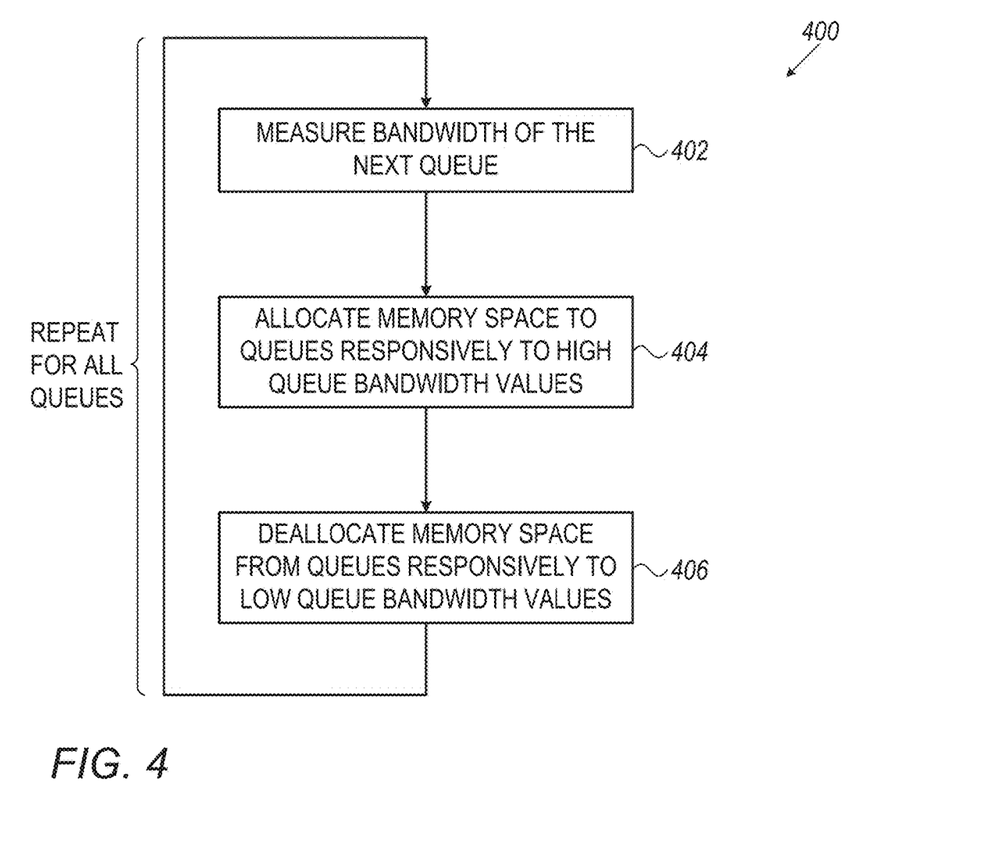
FIG. 4 is a flowchart that schematically illustrates a method for allocating memory to queues responsively to queue bandwidth measurements, in accordance with an embodiment of the present invention.

FIG. 4 is a flowchart 400 that schematically illustrates a method for allocating memory to queues responsively to queue bandwidth measurements, in accordance with an embodiment of the present invention. The flowchart is executed by the memory management circuit (MMC) 108 (FIG. 1).

The flowchart starts at a measure-bandwidth step 402, wherein the MMC measures the bandwidth of a queue from the set of all queues (or of a selected subset of the queues). Bandwidth measurement can be done, for example, by the circuits described with reference to FIG. 2B.

Next, at an allocate-memory step 404, the MMC allocates, responsively to a high bandwidth value, additional shared memory space to the queue. As a high-bandwidth queue may rapidly overflow its allocated memory space, increasing the space responsively to a measured high bandwidth value may prevent loss of data. A bandwidth may be considered high responsively to a comparison of the bandwidth to a preset high threshold. In some embodiments the high threshold may dynamically change, responsively to the sum or bandwidths of all queues pertaining to the same port. (It should be noted that, in embodiments, the high bandwidth measured for the queue is one of a plurality of criteria used by the MMC to determine if the memory allocation of the queue should be increased.)

The MMC then enters a deallocate-memory step 406, wherein the MMC, responsively to a low bandwidth value, deallocates memory space from the low-bandwidth queue. Typically, the MMC returns the deallocated memory space to a pool of memory segments, which the MMC may then allocate to queues that need additional memory space.

After step 406, the MMC reenters step 402, to handle bandwidth-based memory allocation and deallocation for the next queue. The loop comprising steps 402, 404 and 406 repeats for all queues (or, in an embodiment, for a subset of the queues). After executing the loop for all queues, the MMC may restart the loop from the first queue; in some embodiment, the loop comprising steps 402, 404 and 406 executes as long as the network device is active.

The flowchart illustrated in FIG. 4 and described hereinabove is cited by way of example. Other suitable flowcharts may be used in alternative embodiments. For example, in an embodiment, the MMC measures bandwidth only for congested queues; in other embodiments the MMC continuously measures and registers the bandwidths of all queues but uses the registered bandwidth value only when congestion conditions occur.

In some embodiments, the network device may use the queue bandwidth measurements for other purposes, in addition (or alternatively) to the allocating and deallocating of memory space. For example, in an embodiment, the network device may expose the bandwidths to users.

Bandwidth Related Triggers

In some embodiments, bandwidth measurements of queues may trigger activities in the network device, in addition or instead of the memory allocation and deallocation to queues described above. In some embodiments, bandwidth related interrupts may be defined by a user (e.g., trigger a CPU interrupt if the bandwidth of any queue is beyond a preset maximum for more than a preset time). In another embodiment, queue measures may be used by a congestion control algorithm employed by the network device. In other embodiments, packet mirroring may be triggered based on the queue bandwidth, to enable visibility and/or remote analysis/telemetry. In an embodiment, the bandwidth measurement may be used by a packet processor, e.g., as a criterion to redirect or to duplicate the packet, again, to enable visibility and to allow remote analysis/telemetry. Lastly, in some embodiments, queue bandwidth measurements may be exposed to users.

Figure 5:
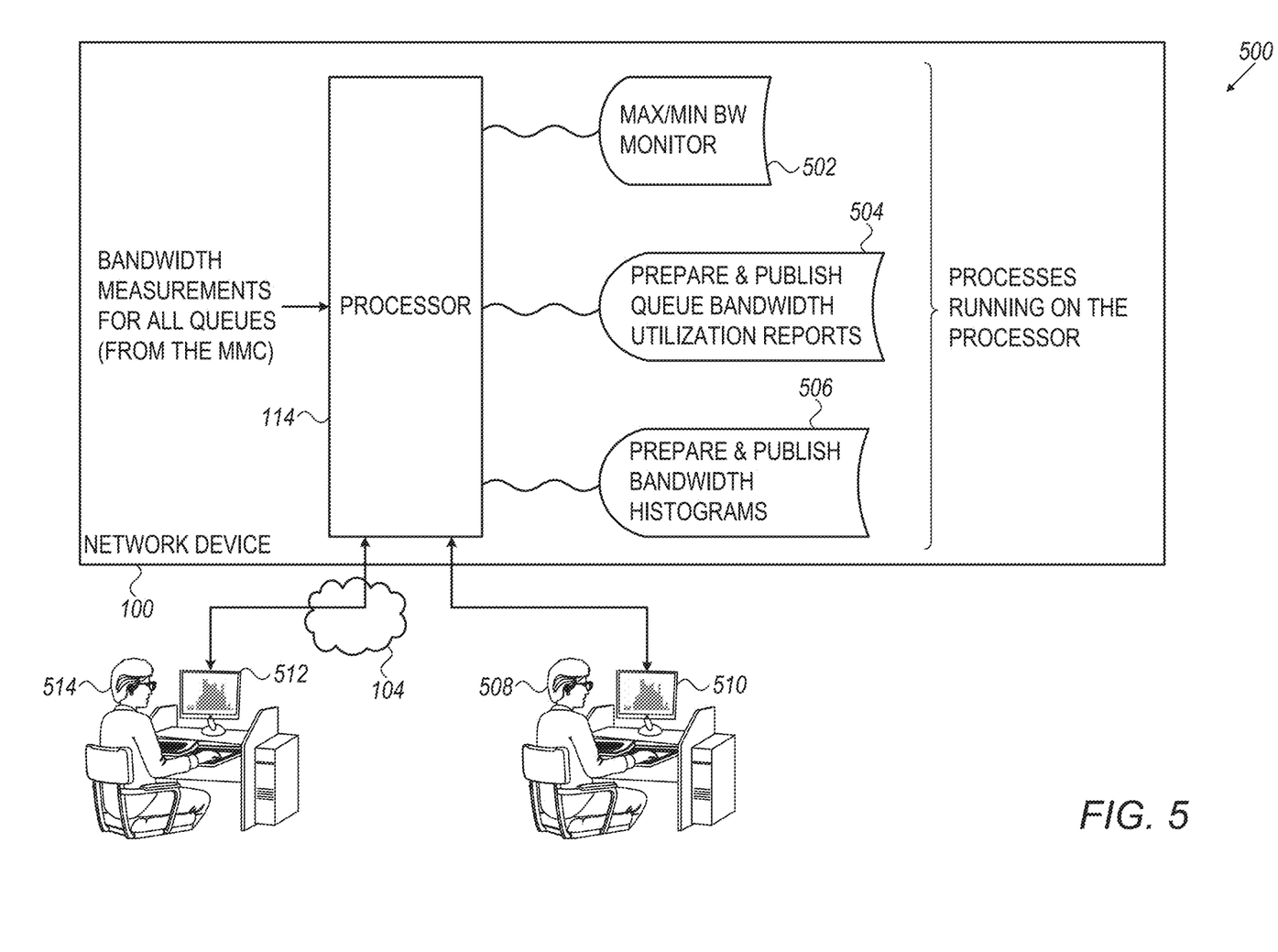
FIG. 5 is a block diagram that schematically illustrates a system for exposing queue bandwidth data to users, in accordance with an embodiment of the present invention.

FIG. 5 is a block diagram that schematically illustrates a system 500 for the exposition of queue bandwidth data to users, in accordance with an embodiment of the present invention. Processor 114 of Network device 100 (FIG. 1) receives the bandwidth values of various communication queues from MMC 108 (the bandwidths may be measured, example, according to the technique illustrated in FIG. 2B and described with reference thereof). According to the example embodiment illustrated in FIG. 5, the processor may run a plurality of processes, including processes that process and expose bandwidth to users (the term "user" refers, in this example embodiment, to a human user such as a network maintenance engineer; in other embodiments, however, the term "user" may also apply to non-human users, e.g., to network supervisory computer programs).

The processes that processor 114 executes may include a max-min bandwidth monitor 502, which compares the bandwidth to preset extremum values and alerts the user if any of the extrema are exceeded; a queue bandwidth utilization process, which prepares and publishes (e.g., sends to a user) a report that lists the bandwidth utilization of queues; and a bandwidth histogram process 506, which prepares and publishes histograms of the queues.

According to the example embodiment illustrated in FIG. 5, processor 114 may send the alerts, reports and/or histograms generated by processes 502, 504 and 506 to a local user 508 through a graphic input/output device 510 that is coupled to the network device. Alternatively, or additionally the processor may send the reports, through network 104, to a remote graphic input output device 512, for use by a remote user 514. Users 508 and/or 512 may interactively control processes 502, 504 and/or 506; (e.g., defining thresholds for the alerts, adding, or removing queues from the reports and from the histogram, etc.).

Thus, according to the example embodiment illustrated in FIG. 5, a network device that measures bandwidths of queues can not only allocate memory to the queues responsively to the bandwidth, but also send bandwidth related reports, visualized views, and alerts, pertaining to the measured bandwidths.

It should be clarified that the configuration illustrated and FIG. 5 and described hereinabove is an example that is cited merely for the sake of conceptual clarity. Other suitable configurations may be used in alternative embodiments. For example, in practice, the display of bandwidth related information to the user would be coupled with other visibility parameters which may be defined by the user or by a suitable monitor software. In some embodiments, the visibility data is used by a network optimization software program.

In some embodiments, bandwidth reports and histograms may be generated by a remote processor, which reads the bandwidth measurement results from MMC 108. In an embodiment, a supervisory program may request the generation of bandwidth reports of queues that are coupled to a suspicious port; and in another embodiment a maintenance engineer may request, for example, that all queue bandwidth measurements during a 24-hour period should be stored in a maintenance file.

The configuration of network device 100, including MMC 108, shared-memory allocation control 116 and MAC 252, the configuration of circuitry 300 and of bandwidth exposition system 500, as well as flowchart 400, are example configurations and methods that are shown purely by way of illustration. Any other suitable configurations and methods can be used in alternative embodiments.

In various embodiments, the bandwidth measurements circuitry, the ensuing memory allocation/deallocation circuitry, and the bandwidth-related exposition circuitry described hereinabove may be carried out by hardware, by software, or by a combination of hardware and software.

In various embodiments, the different elements of network device 100 seen in FIG. 1, including bandwidth measurement and memory allocation/deallocation elements, of MMC 108 seen in FIG. 2B, and of the circuitry seen in FIGS. 3 and 5, may be implemented using suitable hardware, such as one or more Application-Specific integrated Circuits (ASIC) or Field-Programmable Gate Arrays (FPGA), or a combination of ASIC and FPGA.

Processor 114 typically comprises one or more general-purpose processors, which are programmed in software to carry out at least part of the functions described hereinabove. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents is a manner that conflicts with the definitions made explicitly or implicitly in the present specification, only the definitions in the present specification should be considered.

The invention claimed is:

1. A network device, comprising:
   a memory, to store a shared buffer; and
   a memory management circuit, to:
      estimate respective bandwidth measures for multiple queues used in processing packets in the network device, the bandwidth measures being indicative of memory access bandwidths to or from the respective queues; and
      allocate and deallocate segments of the shared buffer to at least one of the queues based on the bandwidth measures using a criterion that, for first and second queues having equal occupancies but the first queue having a larger bandwidth measure than the second queue, would allocate a larger number of segments to the first queue than to the second queue.

2. The network device according to claim 1, wherein the memory management circuit is to measure sizes of data written to the queues during respective time periods, and to estimate the respective bandwidth measures in accordance with the sizes of data.

3. The network device according to claim 1, wherein the memory management circuit is to measure sizes of data read from the queues during respective time periods, and to estimate the respective bandwidth measures in accordance with the sizes of data.

4. The network device according to claim 1, wherein the memory management circuit is to allocate one or more segments of the shared buffer to a given queue responsively to a comparison of a bandwidth measure of the given queue and a preset maximum bandwidth limit.

5. The network device according to claim 1, wherein the memory management circuit is to deallocate one or more segments of the shared buffer from a given queue responsively to a comparison of a bandwidth measure of the given queue and a preset minimum bandwidth limit.

6. The network device according to claim 1, wherein the memory management circuit is to assign a quota of segments of the shared buffer to a given queue in accordance with a bandwidth measure of the given queue, and to allocate the segments of the shared buffer to the given queue from the assigned quota.

7. The network device according to claim 1, wherein the memory management circuit is to assign a quota of segments of the shared buffer to a given queue in accordance with a bandwidth measure of the given queue, and to allocate reserved segments of the memory to the given queue from the quota.

8. The network device according to claim 1, wherein the bandwidth measures comprise one or more bandwidth histograms.

9. The network device according to claim 1, wherein the memory management circuit is to generate an interrupt responsively to a bandwidth measure of a queue.

10. The network device according to claim 1, wherein the memory management circuit is to modify an allocation of segments of the shared buffer to a first queue, in response to a bandwidth measure of a second queue that shares a common resource with the first queue.

11. The network device according to claim 10, wherein the common resource is a shared-buffer pool.

12. The network device according to claim 1, wherein the memory management circuit is to modify a congestion control algorithm responsively to a bandwidth measure.

13. A method, comprising:
estimating respective bandwidth measures for multiple queues used in processing packets in a network device, the bandwidth measures being indicative of memory access bandwidths to or from the respective queues; and
allocating and deallocating segments of a shared buffer of the network device to at least one of the queues, based on the bandwidth measures using a criterion that, for first and second queues having equal occupancies but the first queue having a larger bandwidth measure than the second queue, would allocate a larger number of segments to the first queue than to the second queue.

14. The method according to claim 13, wherein estimating the bandwidth measures comprises measuring sizes of data written to the queues during respective time periods, and estimating the respective bandwidth measures in accordance with the sizes of data.

15. The method according to claim 13, wherein estimating the bandwidth measures comprises measuring sizes of data read from the queues during respective time periods, and estimating the respective bandwidth measures in accordance with the sizes of data.

16. The method according to claim 13, wherein allocating the segments comprises allocating one or more segments of the shared buffer to a given queue responsively to a comparison of a bandwidth measure of the given queue and a preset maximum bandwidth limit.

17. The method according to claim 13, wherein allocating the segments comprises deallocating one or more segments of the shared buffer from a given queue responsively to a comparison of a bandwidth measure of the given queue and a preset minimum bandwidth limit.

18. The method according to claim 13, wherein allocating the segments comprises assigning a quota of segments of the shared buffer to a given queue in accordance with a bandwidth measure of the given queue, and allocating the segments of the shared buffer to the given queue from the assigned quota.

19. The method according to claim 13, wherein allocating the segments comprises assigning a quota of segments of the shared buffer to a given queue in accordance with a bandwidth measure of the given queue, and allocating reserved segments of the memory to the given queue from the quota.

20. The method according to claim 13, wherein the bandwidth measures comprise one or more bandwidth histograms.

21. The method according to claim 13, and comprising generating an interrupt responsively to a bandwidth measure of a queue.

22. The method according to claim 13, wherein allocating and deallocating the segments comprises modifying an allocation of segments of the shared buffer to a first queue, in response to a bandwidth measure of a second queue that shares a common resource with the first queue.

23. The method according to claim 22, wherein the common resource is a shared-buffer pool.

24. The method according to claim 13, and comprising modifying a congestion control algorithm responsively to a bandwidth measure.

25. A method in a network device, the method comprising:
processing packets in the network device using multiple queues;
estimating bandwidth measures for one or more of the queues, the bandwidth measures being indicative of memory access bandwidths to or from the respective queues; and
based on the bandwidth measures, allocating and deallocating segments of a shared buffer of the network device to at least one of the queues using a criterion that, for first and second queues having equal occupancies but the first queue having a larger bandwidth measure than the second queue, would allocate a larger number of segments to the first queue than to the second queue.

* * * * *